United States Patent Office 2,916,887
Patented Dec. 15, 1959

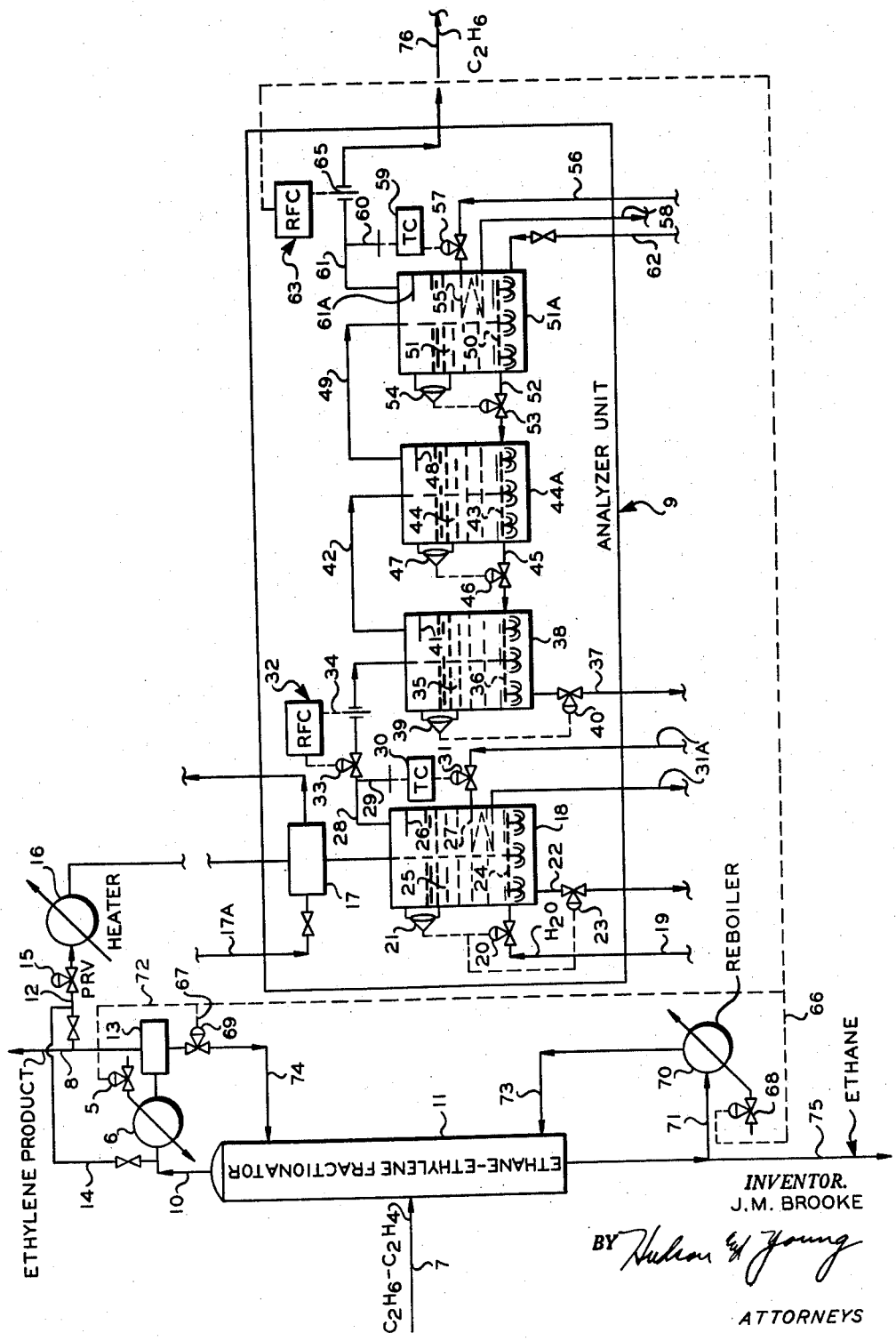

2,916,887

FLOW RATE OF AN IMPURITY CONTROLLING A DISTILLATION PROCESS

Jesse M. Brooke, Sweeny, Tex., assignor to Phillips Petroleum Company, a corporation of Delaware Application May 7, 1956, Serial No. 583,320

10 Claims. (Cl. 62—18)

This invention relates to process control. In one aspect it relates to process control for the production of a product of high purity wherein the low content of impurity is used to control the process. In another aspect it relates to a method for controlling fractional distillation of an ethylene-ethane mixture for the production of an ethylene product of high purity wherein the ethane content of the ethylene product stream in the absence of the ethylene content of the stream is used to control the distillation operation. In yet another aspect it relates to a method for controlling the reboiling or the refluxing of an ethylene-ethane fractional distillation system employing the ethane content of the ethylene product stream to effect the control.

Properties such as specific gravity, boiling point, concentration of desired product in a product stream, index of refraction, infrared absorption, ultraviolet absorption and other properties are used in prior art to control processes. I have discovered a method whereby the flow rate of an extremely small volume of a gaseous impurity of a product is employed to control operation of a process.

An object of my invention is to provide a method and apparatus for controlling process operation.

Another object of my invention is to provide a method and an apparatus, which are inexpensive to construct and easy to operate, for controlling process operation.

Yet another object of my invention is to provide apparatus and a method for process control requiring use of only a very small volume of product to actuate control.

Yet another object of my invention is to provide apparatus and a method for process control wherein the small volume of an impurity from a product stream is used for controlling the process.

Still other objects and advantages of my invention will be realized upon reading the following description which taken with the attached drawing forms a part of this specification.

The drawing illustrates, in diagrammatic form, an assembly of apparatus suitable for carrying out the process of my invention.

According to my invention I have devised a method for controlling a process wherein a product containing a product material and an impurity is produced comprising, withdrawing said product from said process, dividing said product into a first portion, and removing same as the main product of the process, and into a second portion at a predetermined constant rate, separating the product material from said impurity of said second portion, removing the impurity from this separating operation, and controlling said process in response to the rate of removal of the so separated impurity.

Furthermore, the apparatus of my invention includes an apparatus comprising a processing unit, a feed inlet to said unit, a product outlet from said unit, first means for removing a small sample stream of product from said product outlet, second means for removing one component from another component of said sample stream, a third means for sensing flow of said another component of said sample stream, and fourth means for regulating said processing unit in response to flow of said another component of said sample stream sensed by said third means.

Specifically according to my invention the method is used to control a fractional distillation operation for the separation of ethylene of high purity from a feed stream containing ethylene and ethane. Accordingly, I divide the overhead ethylene product into two portions of unequal volumes, the larger portion being the main product of the process and the smaller portion being very small in volume. According to my process, I use such small volumes as one cubic foot per hour under some conditions or even less. This very small volume of gas is passed through a treating apparatus in which the ethylene is removed and only the remaining small volume of ethane (impurity) is actually used in the process control. In such a fractional distillation operation when operating a fractionator for the production of ethylene of 99.5 percent minimum purity, a change of 0.1 percent in ethane content of the product is only one part per thousand of the product stream. According to my invention a change of 0.1 percent in the ethane content based on 0.5 percent maximum ethane content in the product stream represents a 20 percent change. I thus provide apparatus for making use of such a large percentage change in one product of small volume for controlling the fractionation.

Based on the ethylene-ethane fractionation, I preferred to employ an absorbent liquid for removing the ethylene content of the process control stream and such an absorbent liquid which I find is very satisfactory is known as "Hofmann reagent" which is an acid solution of mercuric salts, and this reagent is well known as an absorbent for ethylene.

Referring now to the drawing, reference numeral 11 identifies an ethane-ethylene fractionation column provided with a feed inlet pipe 7, an overhead pipe 10 for removal of overhead vapors and with a pipe 75 for removal of bottoms product. A pipe 71 is provided for passage of a portion of the bottoms product to a reboiler heat exchanger 70 and pipe 73 conducts bottoms material from the heat exchanger back to the kettle section of the fractionator.

The overhead product pipe 10 communicates with a condenser 6 for providing reflux for the operation. Condensate is separated from uncondensed gases in an accumulator 13, the condensate being passed through a pipe 74 into the upper portion of the fractionator as reflux while the uncondensed gas product of the process passes through a pipe 8 for such disposal as desired. A very small portion of the gaseous stream in pipe 8 is diverted into a pipe 12 for use in preparing the product impurity for controlling the operation. If desired, however, a portion of the overhead gases in pipe 10 can be by-passed through a pipe 14 directly to the sample take off pipe 12. In any event, gaseous material entering pipe 12 passes through a presusre reducing valve 15 for reducing the pressure from the fractionator pressure to a pressure suitable for subsequent treatment. After being reduced in pressure this sample stream of gas is heated in heater 16 to a temperature suitable for passage into an analyzer apparatus 9. Gas entering analyzer apparatus 9 from pipe 12 passes through a heat exchanger 17 in indirect heat exchange with a heat exchange fluid passing through a conduit 17A for regulation of temperature to at least a few degrees of that desired to be maintained throughout the analyzer, for example between 200° and 32° F., preferably between 90° and 60° F. This temperature regulated gas passes from exchanger 17 into a humidifier 18. In this humidifier the gas flows through a distributor 24 into a body of water 25 for humidifying the gas stream. It is desirable to humidify this gas stream so that the gas on its subsequent flow through the analyzer apparatus will not dehydrate the treating agent. The pressure of this gas stream is preferably only a few inches of water that is sufficient to cause the gas to flow through the apparatus to the atmosphere. A constant level of water is maintained in the humidifier in response to the operation of a liquid level control 21 regulating a valve 20 in a water makeup conduit 19. In case the level of water increases above a predetermined maximum level in the humidifier 18 float controller 21 also operates a valve 23 in a water draw-off conduit 22. Temperature is maintained constant in the humidifier by insertion of a temperature sensitive element such as a thermocouple 29 in conduit 28. This thermocouple in combination with a temperature controller 30 operates a valve 31 in conduit 31A to control heat exchange medium flowing to and from an exchanger 27 disposed within humidifier 18. A mist trap or extractor 26 is provided to prevent liquid from being carried with the humidified gas into conduit 28.

To provide a definite rate of flow of gas to the critical portion of the analyzer apparatus, I provide a rate of flow controller apparatus 32 communicating with conduit 28. Such a rate of flow controller 32 includes an orifice plate member 34 and a throttle valve 33, which is intended to permit the flow of a predetermined and constant volume of gas.

This constant volume of humidified gas from conduit 28 flows from a distributor 36 in a first absorption unit 38 containing a fixed quantity of an absorbent liquid such as the above-mentioned Hofmann reagent. The gas on passing upward through the body of reagent 35 is depleted of at least a portion of its ethylene content. A constant level of absorbent liquid is maintained in absorber unit 38 by a liquid level controller 39 operating a valve 40 in an absorbent removal conduit 37. Liquid is separated from the treated gas by a mist trap or separator 41 suitably disposed near the point of gas removal from this absorber unit. The so treated gas is passed through a conduit 42 through a distributor 43 into a second ethylene absorber unit 44A in which is provided another quantity 44 of the above mentioned absorbent liquid. The level of this liquid is maintained constant by a liquid level controller 47 operating a valve 46 in a conduit 45 in which liquid absorbent from absorber unit 44A passes to absorber unit 38. Absorber unit 44A is also provided with a mist extractor 48 and liquid-free gas is passed from this absorber unit through a pipe 49 into a third absorber unit 51A. The gas is introduced into this absorber unit through a distributor 50 and into a body of absorbent 51 similar to the absorbent hereinbefore mentioned. The level of absorbent in absorber unit 51A is maintained constant by the operation of a liquid level controller 54 which actuates a valve 53 in a conduit 52 to regulate the flow of treating agent from absorber unit 51A to absorber 44A. Fresh absorbent liquid from a source, not shown, is admitted to the absorber unit 51A through a conduit 62 at substantially a constant rate. Since absorbent liquid is introduced into the absorber unit 51A at a constant rate there is a more or less constant flow of absorbent liquid through conduits 52, 45 and 37 in a generally counter current flow to the gas being treated.

This third absorber unit is also provided with a mist extractor 61A so that fully treated gas passing through a conduit 61 will be free of liquid. It is necessary to make certain that the fully treated gas leaving absorber unit 51A is maintained at a constant temperature and for this operation I provide a thermocouple 60 in conduit 61 and this thermocouple in combination with a temperature controller 59 actuates a valve 57 to regulate flow of a heat exchange medium in conduit 56 to an exchanger 55 disposed within the body of absorbent liquid 51. Used heat exchange medium leaves exchanger 55 by way of a conduit 58.

A rate of flow controller assembly 63 is disposed operatively in communication with conduit 61 for actuating reboiler, and reflux control of fractionator 11. This rate of flow controller comprises an orifice plate unit 65, communicating with the controller assembly identified by reference numeral 63. The controller communicates by way of a conduit 66 to a valve 68 regulating flow of a heating medium to the reboiler heat exchanger 70, by way of a conduit 67 to a valve 69 for regulating the flow of liquid reflux to the upper portion of column 11, and by way of a conduit 72 to a valve 5 for regulating refrigerant to condenser 6 for controlling reflux liquid volume and temperature. The ethane issuing from the orifice plate 65 passes on through a conduit 76 for such disposal as desired. It is usually passed to waste or vented because its volume is too small to warrant recovery.

The rate of flow controller assembly 63 can, if desired, be one specifically adapted for operation with very small quantities of gas. Such an apparatus is sometimes termed a "Flowrator" and in such an apparatus the opening in the orifice plate may be of the order of one or two one-thousandths of an inch in diameter. Orifice plates which pass such small volumes as one or two milliliters of gas per minute are commercially available for use with rate of flow controllers. Since such a type of rate of flow controller apparatus is commercially available it is obvious that relatively small volumes of fractionator overhead product need pass through pipe 12 to the analyzer unit 9. When using an orifice plate capable of passing about one milliliter gas per minute based on a fractionation overhead product containing 99.5 percent ethylene and 0.5 percent ethane requires that only about 200 milliliters per minute of this make gas is introduced into the analyzer unit for absorption of ethylene.

When using such a sensitive rate of flow controller as that described a variation of 0.1 percent in ethylene content of the overhead product registers in the rate of flow controller 63 as a 20 percent change in the volume of ethane flowing through the orifice and such a large change in flow through the orifice easily actuates the controller to carry out its proper function.

In such an ethylene-ethane fractional distillation system the rate of flow control assembly 63 is so constructed that when the flow of ethane exceeds a predetermined maximum rate of flow the controller operates valve 68 to throttle this valve and thus reduce the rate of flow of heat to the reboiler exchanger. Obviously, a decrease in the rate of ethane flow below a predetermined rate through the orifice plate 65 causes an opening of valve 68 to permit a greater flow of the heating medium through exchanger 70 for increasing the reboiling action of the column. When controlling the fractionation by reflux, and the flow of ethane to the orifice plate 65 exceeds the above-mentioned maximum rate of flow the controller operates the reflux valve 69 to open same to allow the addition of more reflux to the column. Conversely when the rate of ethane flow through the orifice 65 decreases below a predetermined minimum the controller operates valve 69 to restrict flow of reflux to the column. The rate of flow controller 63 in place of actuating the liquid reflux valve 69 can be used to regulate the rate of flow of refrigerant through condenser 6 by actuating a motor valve 5. In this manner the temperature of the reflux liquid and its volume are regulated and such operation is well known in the art. The lower the reflux temperature the less reflux liquid is required for production of a given overhead product.

While I have hereinabove described my invention as applied to the control of an ethane-ethylene fractionating column, it is intended that my invention apply to other process operations such as a liquid-gas absorption process, a liquid-liquid extraction process, a cracking process, treating processes of various kinds, and many other processes. All that is required is that, for example the component being produced in major concentration be removed from the product stream passing to my analyzer unit and the remaining component in small volume passed through a rate of flow controller orifice plate to actuate the controller for regulating the process.

While I have disclosed that an acid mercuric salt solution such as the Hofmann reagent is suitable for absorbing ethylene from admixture with ethane, other suitable absorbent reagents can be used, if desired.

In the example given hereinbefore in which an ethylene product containing 99.5 percent ethylene and 0.5 percent ethane was desired, the final product can be produced having other degrees of purity, for example 99 percent ethylene-1 percent ethane, or even 99.9 percent ethylene-0.1 percent ethane, and my method of control is also applicable thereto.

In the case of, for example, a hydrocarbon cracking unit, there may be merely a conversion unit, a feed inlet and a product outlet, and a small fraction of the product passed to my analyzer and control apparatus, and the control apparatus adapted to regulate rate of flow of feed to the conversion unit, its temperature, or temperature within the conversion unit.

If desired, the temperature of the moist impurity gas flowing in pipe or tube 61 can be maintained the same as the temperature of the moist gas in pipe or tube 28 prior to absorption of the product gas, and under these conditions the rate of flow of gas in tube 61 in relation to the rate of flow of gas in tube 28 prior to absorption is an indication of the content of impurity gas in the overhead product of the fractionator disregarding the small pressure drop through absorbers 38, 44A and 51A.

While certain embodiments of the invention have been described for illustrative purposes the invention obviously is not limited thereto.

I claim:

1. In a process, a method for regulating the content of a major component by volume in a vaporous product containing said major component and a minor impurity component, comprising, withdrawing said product from said process, dividing said product into a major portion by volume and removing same as the make product of the process, and into a minor portion by volume at a predetermined rate, said portions being wholly vaporous and having like compositions, separating the major component substantially completely from said impurity of said minor portion, removing the impurity from this separating operation and controlling said process in response to the rate of removal of the separated impurity.

2. The method of claim 1 wherein said major component is ethylene, said impurity is ethane and said process is fractional distillation.

3. In the method of claim 2 regulating the rate of addition of reboiling heat to the distillation operation in inverse proportion to the rate of removal of said resulting ethane.

4. In the method of claim 2 regulating the rate of addition of reflux to said distillation operation in direct response to the rate of removal of said resulting ethane.

5. A method for controlling a fractional distillation operation wherein ethylene is fractionally distilled from an ethylene-ethane mixture, comprising introducing said mixture into a fractional distillation column maintained under fractional distillation conditions and thereby producing an overhead vaporous ethylene product containing a major proportion by volume of ethylene and a minor proportion by volume of ethane as an impurity and a bottoms product comprising ethane, withdrawing said bottoms product as a product of the process, dividing said overhead ethylene product into a major portion by volume as the main product of the process, and into a minor portion by volume at a predetermined rate, said portions being wholly vaporous and having like compositions, separating the ethylene substantially completely from the ethane of said minor portion, removing the resulting ethane from this separating operation and controlling the fractional distillation operation in response to the rate of removal of said resulting ethane.

6. In the method of claim 5 regulating the rate of addition of reboiling heat to the distillation operation in inverse proportion to the rate of removal of said resulting ethane.

7. In the method of claim 5 regulating the rate of addition of reflux to said distillation operation in direct response to the rate of removal of said resulting ethane.

8. An apparatus for separating a major component from a vaporous stream containing said major component and a minor component impurity by volume comprising a fractional distillation column, a feed inlet to said column, an overhead vapor outlet and a bottoms product outlet from said column, heating means communicating with the interior of the lower portion of said column for providing reboiling heat, means for refluxing the head of said column, means for removing a small sample of vapor from said vapor outlet, an absorber for absorbing a major component from a minor component of said small sample of vapor, said absorber having a feed inlet and a residue outlet, a rate of flow controller apparatus communicating with said outlet, a valve for controlling the flow of a heating medium to said heating means, said rate of flow controller apparatus being adapted to actuate said valve in response to the rate of flow of the minor and unabsorbed component of said small sample of vapor of said absorber.

9. An apparatus for separating a major component from a vaporous stream containing said major component and a minor component impurity by volume comprising a fractional distillation column, a feed inlet to said column, an overhead vapor outlet from said column, a bottoms product outlet from said column, a reboiler communicating with the interior of the kettle section of said column, a reflux condenser communicating with the overhead vapor outlet, a separator for separating condensate from uncondensed vapor from said condenser, a first conduit for passing condensate from said separator to reflux the column, a second conduit for removal of uncondensed vapor from said separator, means for removal of a small sample of vapor from said second conduit, an absorber for absorbing a major component from a minor component of said small sample of vapor, said absorber having a feed inlet and a residue outlet, a rate of flow controller apparatus communicating with said outlet, a valve for controlling the rate of flow of condensate in said first conduit, said rate of flow controller apparatus being adapted to actuate said valve in response to the rate of flow of the minor and unabsorbed component of said small sample of vapor of said absorber.

10. An apparatus for sparating a major component from a vaporous stream containing said major component and a minor component impurity by volume comprising a fractional distillation column, a feed inlet to said column, an overhead vapor outlet from said column, a bottoms product outlet from said column, a reboiler for providing reboiling heat to said column, a reflux condenser communicating with said overhead vapor outlet, a separator for separating reflux condensate from uncondensed vapor of said condenser, a first conduit for passing condensate from said separator to reflux said column, a second conduit for removal of uncondensed vapor from said separator, means for removal of a small sample of vapor from said second conduit, an absorber for absorbing a major component from a minor component of said small sample of vapor, said absorber having a feed inlet and a residue outlet, a rate of flow controller apparatus communicating with said outlet, said rate of flow controller apparatus being adapted to regulate flow of refrigerant through said condenser in response to the rate of flow of the minor and unabsorbed component of said small sample of vapor of said absorber.

References Cited in the file of this patent

UNITED STATES PATENTS

| | | |
|---|---|---|
| 2,002,621 | Wiesler | May 28, 1935 |
| 2,358,242 | Moore | Sept. 12, 1944 |
| 2,386,831 | Wright | Oct. 16, 1945 |
| 2,541,380 | Polly et al. | Feb. 13, 1951 |
| 2,600,133 | Simms | June 10, 1952 |
| 2,636,904 | Starr et al. | Apr. 28, 1953 |
| 2,731,810 | Hachmuth | Jan. 24, 1956 |
| 2,785,544 | Levin | Mar. 19, 1957 |
| 2,794,924 | Skarstrom | June 4, 1957 |
| 2,813,010 | Hutchins | Nov. 12, 1957 |